(12) United States Patent
Reck et al.

(10) Patent No.: US 6,348,530 B1
(45) Date of Patent: Feb. 19, 2002

(54) THERMOSETTING AQUEOUS COMPOSITIONS

(75) Inventors: Bernd Reck, Grünstadt; Stefan Dreher, Neustadt; Wilhelm Friedrich Beckerle, Bobenheim-Roxheim; Eckehardt Wistuba, Bad Dürkheim; Michael Seufert, Bad Dürkheim; Joachim Roser, Mannheim; Johannes Türk, Böhl-Iggelheim, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/462,066

(22) PCT Filed: Jul. 8, 1998

(86) PCT No.: PCT/EP98/04257

§ 371 Date: Jan. 4, 2000

§ 102(e) Date: Jan. 4, 2000

(87) PCT Pub. No.: WO99/02591

PCT Pub. Date: Jan. 21, 1999

(30) Foreign Application Priority Data

Jul. 8, 1997 (DE) .......................................... 197 29 161

(51) Int. Cl.[7] .............................. C08K 5/17; C09D 5/02; C08F 2/44; C08L 57/04; D04H 1/64
(52) U.S. Cl. ...................... 524/244; 524/245; 524/247; 524/249; 524/250; 524/251; 524/460; 526/203; 526/209; 526/211; 526/217; 526/220
(58) Field of Search ................................ 524/244, 245, 524/247, 249, 250, 251, 460; 526/203, 209, 211, 217, 220

(56) References Cited

U.S. PATENT DOCUMENTS

| 3,784,396 | A |   | 1/1974  | Fourment et al. |
|-----------|---|---|---------|-----------------|
| 4,076,917 | A |   | 2/1978  | Swift et al. |
| 4,670,505 | A | * | 6/1987  | Craig ......................... 524/704 |
| 4,820,762 | A |   | 4/1989  | Tsaur |
| 4,839,413 | A |   | 6/1989  | Kiehlbauch et ak. |
| 4,868,016 | A |   | 9/1989  | Lorah et al. |
| 4,954,558 | A |   | 9/1990  | Tsaur |
| 5,122,559 | A | * | 6/1992  | Dotzauer et al. ........... 524/243 |
| 5,314,943 | A | * | 5/1994  | Steinwand ................... 524/501 |
| 5,427,587 | A |   | 6/1995  | Arkins et al. |
| 5,661,213 | A |   | 8/1997  | Arkins et al. |
| 5,718,728 | A |   | 2/1998  | Arkins et al. |
| 5,763,524 | A |   | 6/1998  | Arkins et al. |
| 5,812,316 | A |   | 9/1998  | Ochi et al. |

FOREIGN PATENT DOCUMENTS

| CA | 201214  |   | 9/1991  |              |
| CA | 2094464 |   | 12/1993 |              |
| CA | 2098464 | * | 12/1993 | .......... C09J/133/02 |
| EP | 0 445 578 |   | 9/1991  |              |
| EP | 0 576 128 |   | 12/1993 |              |

* cited by examiner

Primary Examiner—David W. Wu
Assistant Examiner—Kelechi C. Egwim
(74) Attorney, Agent, or Firm—Oblon, Spivak, McClelland, Maier & Neustadt, P.C.

(57) ABSTRACT

Heat-curable aqueous compositions which comprise a carboxyl-containing polymer component and optionally a hydroxyalkylated amine are used as binders for shaped articles.

22 Claims, No Drawings

THERMOSETTING AQUEOUS COMPOSITIONS

The present invention relates to heat-curable aqueous compositions comprising a carboxyl-containing polymer component and a hydroxyalkylated amine and to their use as binders for shaped articles.

The solidification or consolidation of sheetlike fiber structures such as fiber nonwovens, shaped articles such as fiberboard or chipboard panels, etc., is frequently done chemically using a polymeric binder. To increase the strength, especially the wet strength and heat stability, it is common to employ binders whose crosslinkers give off formaldehyde. However, this brings with it the risk of formaldehyde emissions.

In order to avoid formaldehyde emissions numerous alternatives have already been proposed to the binders known to date. For instance, U.S. Pat. No. 4,076,917 discloses binders whose crosslinkers comprise β-hydroxyalkylamides and polymers which contain carboxylic acid or carboxylic anhydride. The molar ratio of carboxyls to hydroxyls is preferably 1:1. A disadvantage is the relatively complex preparation of the β-hydroxyalkylamide.

EP-A-445 578 discloses sheets made of finely divided materials, such as glass fibers, in which mixtures of high molecular mass polycarboxylic acids and polyhydric alcohols, alkanolamines or polyfunctional amines act as binders. High molecular mass polycarboxylic acids described are polyacrylic acid and methyl methacrylate-n-butylacrylate-methacrylic acid and methyl methacrylate-methacrylic acid copolymers. Polyhydric alcohols or alkanolamines employed are 2-hydroxymethyl-1,4-butanediol, trimethylolpropane, glycerol, poly(methyl methacrylate-co-hydroxypropyl acrylate), diethanolamine and triethanolamine. However, the water resistance of the resulting sheets is unsatisfactory.

EP-A-583 086 discloses formaldehyde-free aqueous binders for producing fiber webs, especially glass fiber webs. The binders comprise a polycarboxylic acid having at least two carboxyl groups with or without anhydride groups. Polyacrylic acid, in particular, is used. The binder also comprises a polyol, for example glycerol, bis[N,N-di(β-hydroxyethyl)adipamide, pentaerythritol, diethylene glycol, ethylene glycol, gluconic acid, β-D-lactose, sucrose, polyvinyl alcohol, diisopropanolamine, 2-(2-aminoethylamino) ethanol, triethanolamine, tris(hydroxymethylamino) methane and diethanolamine. These binders require a phosphorus-containing reaction accelerator in order to achieve sufficient strengths of the glass fiber nonwovens. It is mentioned that a reaction accelerator of this kind can only be absent if a high reactive polyol is employed. β-Hydroxyalkylamides are mentioned as highly reactive polyols.

EP-A-651 088 describes corresponding binders for cellulose fiber substrates. These binders necessarily include a phosphorus-containing reaction accelerator.

EP-A-672 920 describes formaldehyde-free binders, impregnating compositions or coating compositions which comprise at least one polyol and a polymer of which from 2 to 100% by weight is accounted for by an ethylenically unsaturated acid or an acid anhydride comonomer. The polyols are substituted triazine, triazinetrione, benzene or cyclohexyl derivatives, the polyol radicals always being in position 1, 3 and 5 of these rings. Despite a high drying temperature, the wet tear strengths achieved with these binders on glass fiber nonwovens are low. In comparative experiments, amine-containing crosslinkers and predominantly linear polyols were tested as well. It is mentioned that amine-containing crosslinkers have a flocculating effect and that the predominantly linear polyols lead to weaker crosslinking than the cyclic polyols.

DE-A-22 14 450 describes a copolymer composed of from 80 to 99% by weight of ethylene and from 1 to 20% by weight of maleic anhydride. Together with a crosslinker, the copolymer is used, in powder form or in dispersion in an aqueous medium, for surface coating. The crosslinker used is an amino-containing polyalcohol. However, in order to bring about crosslinking it is necessary to heat the system at up to 300° C.

EP-A-257 567 describes a polymer composition obtainable by emulsion polymerization of ethylenically unsaturated monomers, such as olefins, vinylaromatic compounds, α,β-ethylenically unsaturated carboxylic acids and their esters, ethylenically unsaturated dicarboxylic anhydrides and vinyl halides. During polymerization a water- or alkali-soluble or -dispersible resin having a number-average molecular weight of from about 500 to about 20,000 is added in order to influence the flow properties of the polymer composition. The resin is composed of olefins, vinylaromatic compounds, α,β-ethylenically unsaturated carboxylic acids and the esters thereof or ethylenically unsaturated dicarboxylic anhydrides. Ammonium hydroxide is indicated as the alkaline medium in which said resin is to be soluble or dispersible. The composition can be used to produce formaldehyde-free coatings on wooden substrates.

EP-A-576 128 describes repulpable adhesive compositions comprising an acid-rich polymer component and a low-acid polymer component. The acid-rich polymer component is based on a monomer mixture of from 40 to 95% of an alkyl acrylate or methacrylate and from 5 to 60% of an ethylenically unsaturated acid, such as acrylic or methacrylic acid. The low-acid polymer component is based on a monomer mixture of from 90 to 100% of an alkyl acrylate or methacrylate and from 0 to 10% of an ethylenically unsaturated acid. The compositions are prepared by aqueous emulsion polymerization, with the acid-rich polymer component being polymerized in the presence of the low-acid polymer component or vice versa. The pH of the composition is set at the desired level by adding ammonium hydroxide or sodium hydroxide. The composition can be used as a pressure-sensitive adhesive, laminating adhesive, adhesive for textile wovens, tiles and packaging, and as wood glue.

U.S. Pat. No. 5,314,943 describes a quick-curing formaldehyde-free binder composition of low viscosity for textile materials. The composition comprises a latex, which is a copolymer based on a vinylaromatic compound and a conjugated diene, and a water-soluble copolymer, which is obtained by copolymerizing a mixture of at least one ethylenically unsaturated polycarboxylic acid and at least one olefinically unsaturated monocarboxylic acid. The pH of the composition is set at from 5 to 9 by means of ammonium hydroxide or sodium hydroxide. The composition is employed as a binder for textile substrates.

U.S. Pat. No. 4,868,016 describes a composition based on at least one thermoplastic latex polymer which is insoluble in an aqueous alkaline medium and on at least one alkali-soluble polymer which is incompatible with the latex polymer. The latex polymer is a water-dispersed polymer which can be composed of acrylic or methacrylic esters, vinylaromatic compounds and vinyl esters and of from 0.5 to 3% by weight of an ethylenically unsaturated carboxylic acid as additional copolymer. The alkali-soluble polymer is also composed of these monomers, but contains from 10 to 60% by weight of an ethylenically unsaturated carboxylic acid. To establish the pH at >7 the composition can include ammonia, triethylamine, ethylamine or dimethylhydroxyethylamine. It can be used to provide substrates with a coating.

It is known that stable aqueous (meth)acrylate dispersions formed by emulsion polymerization in the presence of protective colloids can only be obtained if at least 50% of vinyl acetate, based on overall monomers, is incorporated by copolymerization. If the amount of vinyl acetate is less than 50%, agglomeration occurs. U.S. Pat. No. 4,670,505 describes as a solution to this problem a polyacrylate dispersion which is prepared by emulsion polymerization in the presence of from 0.1 to 5% by weight of at least one water soluble amino alcohol having 2 to 36 carbon atoms and from 0.04 to 5% by weight of a protective colloid, based in each case on overall monomers. The resulting latices are of low viscosity and improved pigment binding capacity, and are essentially free from gel specks and stable to shearing.

It is-an object of the present invention to provide shaped articles with formaldehyde-free binders which permit rapid curing at low temperature and which impart water resistance to the substrate.

We have found that this object is achieved by heat-curable compositions comprising at least one polymer (A1), which contains from 0 to 5% by weight of an $\alpha,\beta$-ethylenically unsaturated mono- or dicarboxylic acid in copolymerized form and which is obtainable by free-radical polymerization in the presence of a) at least one polymer (A2) obtainable by free-radical polymerization and containing from 15 to 100% by weight of an $\alpha,\beta$-ethylenically unsaturated mono- or dicarboxylic acid in copolymerized form, and b) at least one amine comprising at least one long chain having at least six carbons, the weight ratio (based on solids) of polymer (A1) to polymer (A2) being from 7:1 to 1:7 and that of polymer (A2) to long-chain amine being from 20:1 to 2:1.

For the purposes of the present invention, alkyl is preferably straight-chain or branched $C_1$–$C_{18}$-alkyl, especially $C_1$–$C_{12}$-alkyl and, with particular preference, $C_1$–$C_6$-alkyl, such as methyl, ethyl, n-propyl, isopropyl, n-butyl, sec-butyl, tert-butyl, n-pentyl, n-hexyl, 2-ethylhexyl, n-dodecyl or n-stearyl.

Hydroxyalkyl is preferably hydroxy-$C_1$–$C_6$-alkyl and, in particular, 2-hydroxyethyl and 2- or 3-hydroxypropyl.

Cycloalkyl is preferably $C_5$–$C_7$-cycloalkyl, especially cyclopentyl and cyclohexyl.

Aryl is preferably phenyl or naphthyl.

Polymer (A1):

The polymer A1 can be prepared using all monomers which can be polymerized by free-radical polymerization. In general, the polymer A1 is composed of:

from 60 to 100 parts by weight, based on the overall weight of the monomers for the polymer Al, of at least one copolymerizable monomer (principal monomer), from 0 to 35 parts by weight, preferably from 0 to 20 parts by weight, of at least one functional monomer (comonomer) and from 0 to 5 parts by weight, preferably from 0 to 3 parts by weight, of an $\alpha,\beta$-unsaturated mono- or dicarboxylic acid, preferably from 0 to 3% by weight.

The principal monomer is preferably selected from esters of preferably $C_3$–$C_6$ $\alpha,\beta$-monoethylenically unsaturated mono- or dicarboxylic acids, such as acrylic, methacrylic, maleic, fumaric and itaconic acid, with in general $C_1$–$C_{12}$-, preferably $C_1$–$C_8$- and especially $C_1$–$C_4$-alkanols.

Particular such esters are methyl, ethyl, n-butyl, isobutyl, tert-butyl and 2-ethylhexyl acrylate and methacrylate;

vinylaromatic compounds, such as styrene, $\alpha$-methylstyrene, o-chlorostyrene or vinyltoluenes;

vinyl esters of $C_1$–$C_8$ mono- or dicarboxylic acids, such as vinyl acetate, propionate, n-butyrate, laurate and stearate;

butadiene.

Particularly preferred principal monomers are methyl methacrylate, methyl acrylate, n-butyl methacrylate, t-butyl methacrylate, ethyl acrylate, n-butyl acrylate, 2-ethylhexyl acrylate, styrene and vinyl acetate.

Suitable comonomers are in particular:

linear 1-olefins, branched-chain 1-olefins or cyclic olefins, such as ethene, propene, butene, isobutene, pentene, cyclopentene, hexene, cyclohexene, octene, 2,4,4-trimethyl-1-pentene alone or mixed with 2,4,4-trimethyl-2-pentene, $C_8$–$C_{10}$ olefin, 1-dodecene, $C_{12}$–$C_{14}$ olefin, octadecene, 1-eicosene ($C_{20}$), $C_{20}$–$C_{24}$ olefin; oligoolefins prepared by metallocene catalysis and having a terminal double bond, such as oligopropene, oligohexene and oligooctadecene; olefins prepared by cationic polymerization and with a high $\alpha$-olefin content, such as polyisobutene. Preferably, however, no ethene or linear 1-olefin is copolymerized into the polymer.

acrylonitrile, methacrylonitrile.

vinyl and allyl $C_1$–$C_{40}$-alkyl ethers where the alkyl can also carry substituents such as a hydroxyl, an amino or dialkylamino or one or more alkoxylate groups, examples being methyl, ethyl, propyl, isobutyl, 2-ethylhexyl, cyclohexyl, 4-hydroxybutyl, decyl, dodecyl, octadecyl, 2-(diethylamino)ethyl, 2-(di-n-butylamino)ethyl and methyldiglycol vinyl ether and the corresponding allyl ethers and/or mixtures thereof.

acrylamides and alkyl-substituted acrylamides, such as acrylamide, methacrylamide, N-tert-butylacrylamide, N-methyl(meth)acrylamide.

sulfo-containing monomers, such as allylsulfonic acid, methallylsulfonic acid, styrenesulfonate, vinylsulfonic acid, allyloxybenzenesulfonic acid, 2-acrylamido-2-methylpropanesulfonic acid, their corresponding alkali metal salts or ammonium salts, and mixtures thereof, and also sulfopropyl acrylate and sulfopropyl methacrylate.

$C_1$–$C_4$-hydroxyalkyl esters of $C_3$–$C_6$ mono- or dicarboxylic acids (see above), especially those of acrylic, methacrylic or maleic acid or their derivatives alkoxylated with from 2 to 50 mol of ethylene oxide, propylene oxide, butylene oxide or mixtures thereof, or esters of $C_1$–$C_{18}$ alcohols, alkoxylated with from 2 to 50 mol of ethylene oxide, propylene oxide, butylene oxide or mixtures thereof, with the abovementioned acids, examples being hydroxyethyl (meth)acrylate, hydroxypropyl (meth)acrylate, 1,4-butanediol monoacrylate, ethyldiglycol acrylate, methylpolyglycol acrylate (11 EO), (meth)acrylic esters of $C_{13}/C_{15}$ oxo alcohol reacted with 3,5,7,10 or 30 mol of ethylene oxide, and mixtures thereof.

vinylphosphonic acid, dimethyl vinylphosphonate and other phosphorus-containing monomers.

alkylaminoalkyl (meth)acrylates or alkylaminoalkyl (meth)acrylamides or quaternization products thereof, examples being 2-(N,N-dimethylamino)ethyl (meth) acrylate, 3-(N, N-dimethylamino)propyl (meth) acrylate, 2-(N,N,N-trimethylammonium)ethyl (meth) acrylate chloride, 2-dimethylaminoethyl(meth) acrylamide, 3-dimethylaminopropyl(meth)acrylamide, 3-trimethylammoniumpropyl(meth)acrylamide chloride.

allyl esters of $C_1$–$C_{30}$-monocarboxylic acids.

N-vinyl compounds, such as N-vinylformamide, N-vinyl-N-methylformamide, N-vinylpyrrolidone, N-vinylimidazole, 1-vinyl-2-methylimidazole, 1-vinyl-2-methylimidazoline, N-vinylcaprolactam, vinylcarbazole, 2-vinylpyridine, 4-vinylpyridine.

diallyldimethylammonium chloride, vinylidene chloride, vinyl chloride, acrolein, methacrolein.

1,3-diketo-containing monomers, such as acetoacetoxyethyl (meth)acrylate or diacetoneacrylamide, monomers containing urea groups, such as ureidoethyl (meth)acrylate, acrylamidoglycolic acid, methacrylamidoglycolate methyl ether.

silyl-containing monomers, such as trimethoxysilylpropyl methacrylate.

glycidyl-containing monomers, such as glycidyl methacrylate.

Particularly preferred comonomers are hydroxyethyl acrylate, hydroxypropyl acrylate, hydroxybutyl acrylate and hydroxyethyl methacrylate. Very particular preference is given to hydroxyethyl acrylate and hydroxyethyl methacrylate, especially in amounts of from 2 to 20% by weight, based on overall monomers A1.

The $\alpha,\beta$-ethylenically unsaturated mono- and dicarboxylic acids are in particular those having 3 to 6 carbons. Examples are acrylic, methacrylic, crotonic, fumaric, maleic, 2-methylmaleic or itaconic acid and also monoesters of ethylenically unsaturated dicarboxylic acids, such as maleic acid monoalkyl esters of $C_1$–$C_8$-alkanols.

The polymers can be prepared by customary polymerization techniques. For all polymerization methods the customary apparatus is used, examples being stirred vessels, cascades of stirred vessels, autoclaves, tube reactors and compounders.

Polymerization is preferably carried out in the presence of compounds which form free radicals (initiators). The amount required of these compounds is preferably from 0.05 to 10, more preferably from 0.2 to 5% by weight, based on the monomers employed in the polymerization.

Examples of suitable polymerization initiators are peroxides, hydroperoxides, peroxodisulfates, percarbonates, peroxo esters, hydrogen peroxides and azo compounds. Examples of initiators, which may be soluble or insoluble in water, are hydrogen peroxide, dibenzoyl peroxide, dicyclohexyl peroxodicarbonate, dilauroyl peroxide, methyl ethyl ketone peroxide, di-tert-butyl peroxide, acetylacetone peroxide, tert-butyl hydroperoxide, cumene hydroperoxide, tert-butyl perneodecanoate, tert-amyl perpivalate, tert-butyl perpivalate, tert-butyl perneohexanoate, tert-butyl per-2-ethylhexanoate, tert-butyl perbenzoate, lithium, sodium, potassium and ammonium peroxodisulfates, azodiisobutyronitrile, 2,2'-azobis(2-amidinopropane) dihydrochloride, 2-(carbamoylazo)isobutyronitrile and 4,4-azobis(4-cyanovaleric acid). Other polymerization initiators which can be used are the known redox initiator systems, such as $H_2O_2$/ascorbic acid or t-butyl hydroperoxide/sodium hydroxymethanesulfinate.

The initiators can be employed alone or in a mixture with one another, such as mixtures of hydrogen peroxide and sodium peroxodisulfate. For polymerization in an aqueous medium it is preferred to employ water-soluble initiators.

To prepare polymers of low average molecular weight it is often judicious to carry out the copolymerization in the presence of regulators. Customary regulators can be used for this purpose, such as, for example, organic SH-containing compounds such as 2-mercaptoethanol, 2-mercaptopropanol, mercaptoacetic acid, tert-butylmercaptan, n-octylmercaptan, n-dodecylmercaptan and tert-dodecylmercaptan, hydroxylammonium salts, such as hydroxylammonium sulfate, formic acid, sodium bisulfite or isopropanol. The polymerization regulators are generally employed in amounts of from 0.05 to 5% by weight, based on the monomers.

To prepare copolymers of higher molecular mass it is often judicious to operate in the presence of crosslinkers in the course of the polymerization. Such crosslinkers are compounds having two or more ethylenically unsaturated groups, such as diacrylates or dimethacrylates of at least dihydric saturated alcohols, examples being ethylene glycol diacrylate, ethylene glycol dimethacrylate, 1,2-propylene glycol diacrylate, 1,2-propylene glycol dimethacrylate, 1,4-butanediol diacrylate, 1,4-butanediol dimethacrylate, hexanediol diacrylate, hexanediol dimethacrylate, neopentyl glycol diacrylate, neopentyl glycol dimethacrylate, 3-methylpentanediol diacrylate and 3-methylpentanediol dimethacrylate. The acrylic and methacrylic esters of alcohols having more than 2 OH groups can also be employed as crosslinkers, examples being trimethylolpropane triacrylate and trimethylolpropane trimethacrylate. Another class of crosslinkers is that comprising diacrylates or dimethacrylates of polyethylene glycols or polypropylene glycols having molecular weights of in each case from 200 to 9000.

Apart from the homopolymers of ethylene oxide and/or propylene oxide it is also possible to employ block copolymers of ethylene oxide and propylene oxide or copolymers of ethylene oxide and propylene oxide which comprise the ethylene oxide and propylene oxide units in random distribution. The oligomers of ethylene oxide and/or propylene oxide are also suitable for the preparation of the crosslinkers, examples being diethylene glycol diacrylate, diethylene glycol dimethacrylate, triethylene glycol diacrylate, triethylene glycol dimethacrylate, tetraethylene glycol diacrylate and/or tetraethylene glycol dimethacrylate.

Further suitable crosslinkers are vinyl acrylate, vinyl methacrylate, vinyl itaconate, divinyl adipate, butanediol divinyl ether, trimethylolpropane trivinyl ether, allyl acrylate, allyl methacrylate, pentaerythritol triallyl ether, triallylsucrose, pentaallylsucrose, methylenebis(meth) acrylamide, divinylethylene urea, divinylpropylene urea, divinylbenzene, divinyldioxane, triallyl cyanurate, tetraallylsilane, tetravinylsilane and bis- or polyacrylic siloxanes (for example, Tegomer® products from Th. Goldschmidt AG). The crosslinkers are preferably employed in amounts from 10 ppm to 5% by weight, based on the monomers to be polymerized.

The polymer A1 is usually prepared in water as the dispersing medium. However, water-miscible organic solvents, such as alcohols and ketones, examples being methanol, ethanol, n-propanol, isopropanol, n-butanol, acetone or methyl ethyl ketone, may also be present in a proportion of around 30% by volume. The result is a fine, stable polymer dispersion. The particle sizes can be determined by the methods customary for aqueous emulsion polymers. For example, the particle sizes determined by means of quasielastic light scattering are generally in the range from 30 to 1500 nm, preferably from 40 to 500 nm. The particle size distribution can be monomodal or polymodal.

The preparation of the polymer A1 is preferably carried out only with the acid-rich polymer A2 and the long-chain amine as the sole agents stabilizing the resulting dispersion particles. The polymer A2 and the long-chain amine form a polymeric ammonium salt which stabilizes the resulting polymer particles or polymer droplets and so leads to stable polymer dispersions with a low coagulum content.

Without the acid-rich polymer A2 the resulting polymer dispersions lack water resistance and have a poor thermal stability. Omission of the long-chain amine leads in many cases to coagulation of the polymerization mixture.

In addition to stabilization by the polymer A2 and the long-chain amine, however, it is also possible in the preparation of A1 to add surface-active auxiliaries such as emulsifiers or protective colloids.

Of the emulsifiers or protective colloids typically used for this purpose, anionic, nonionic, cationic and amphoteric emulsifiers are suitable. Preference is given to anionic emulsifiers, such as alkylbenzenesulfonic acids, sulfonated fatty acids, sulfosuccinates, fatty alcohol sulfates, alkylphenol sulfates and fatty alcohol ether sulfates. Examples of nonionic emulsifiers which can be used are alkylphenol ethoxylates, primary alcohol ethoxylates, fatty acid ethoxylates, alkanolamide ethoxylates, EO/PO block copolymers and alkyl polyglucosides. Examples of cationic and/or amphoteric emulsifiers used are quaternized aminoalkoxylates, alkylbetaines, alkylamidobetaines and sulfobetaines.

Examples of typical protective colloids are cellulose derivatives, polyethylene glycol, polypropylene glycol, copolymers of ethylene glycol and propylene glycol, polyvinyl acetate, polyvinyl alcohol, polyvinyl ether, starch and starch derivatives, dextran, polyvinylpyrrolidone, polyvinylpyridine, polyethyleneimine, polyvinylimidazole, polyvinylsuccinimide, polyvinyl-2-methylsuccinimide, polyvinyl-1,3-oxazolid-2-one and polyvinyl-2-methylimidazoline.

The emulsifiers or protective colloids are usually used in concentrations of less than 5% by weight, based on the monomers. It is preferred to work without emulsifiers or protective colloids.

The monomers can be neutralized in whole or in part, prior to or during polymerization, by means of customary inorganic or organic bases. Examples of suitable bases are alkali or alkaline earth metal compounds, such as sodium, potassium or calcium hydroxide, sodium carbonate, ammonia and primary, secondary or tertiary amines, such as di- or triethanolamine.

It is particularly preferred not to carry out neutralization before and during the polymerization. Even after the polymerization it is preferred not to add any neutralizing agent, apart from the alkanolamine which may be added.

The polymerization can be carried out continuously or discontinuously in a customary manner and in accordance with a large number of variants.

When the above-described polymerization process is employed in the presence of a polymer (A2) and the long-chain amine, polymers (A1) having a weight-average molecular weight of from 1000 to 5,000,000, preferably from 5000 to 2,000,000, are obtained. A readily available measure of the average molecular weight of a polymer is its K value. The K value is a relative viscosity number which is determined in analogy to DIN 53726. It comprises the flow rate of the pure solvent relative to the flow rate of a solution of polymer A2 in this solvent. A high K value corresponds to a high average molecular weight (cf. Cellulosechemie, Vol. 13, (1932), pp. 58–64 and Kirk-Othmer, Encyclopedia of Chemical Technology, Vol. 23, pp. 967–968). The K values are generally in the range from 15 to 150 (1% strength by weight in dimethylformamide). The emulsion polymerization can be carried out so that the solids content is in the range from 20 to 70%, preferably from 30 to 60%, by volume.

From 15 to 100% by weight of the polymer (A2), preferably from 20 to 100% by weight, in particular from 40 to 100% by weight and, with particular preference from 60 to 100% by weight is composed of at least one $\alpha,\beta$-ethylenically unsaturated mono- or dicarboxylic acid. The polymer may also be present in part or completely in the form of a salt; the acidic form is preferred. The solubility in water of the polymer in the acidic form is preferably >10 g/l (at 25° C.).

The weight-average molecular weight of the polymer (A2) is more than 500 and generally less than 5 million. The K values of the polymers (in accordance with H. Fikentscher, Cellulose-Chemie 13 (1932), pp. 58–64, 71 and 74), which are a measure of the molecular weight, are in general in the range from 10 to 150 (measured in 1% strength by weight aqueous solution). The polymer has on average generally at least 4 carboxylic acid groups, or salt groups derived therefrom, per polymer chain.

Ethylenically unsaturated carboxylic acids which can be used have already been specified above in connection with polymer (A1). Particular preference is given to polymers which include maleic acid, such as copolymers of maleic and acrylic acids. The polymers can also be obtained starting from ethylenically unsaturated mono- or dicarboxylic anhydrides alone or in a mixture with the abovementioned carboxylic acids. Under the polymerization conditions, for example in solution or emulsion polymerization in an aqueous medium, or subsequent to the polymerization, the anhydride functions are converted to carboxylic acid groups by reaction with an acid or base. Ethylenically unsaturated carboxylic anhydrides that can be used are, in particular, maleic, itaconic, acrylic and methacrylic anhydrides.

In addition to the mono- or dicarboxylic acids the polymer (A2) can also include, in copolymerized form, from 0 to 85% by weight, preferably from 0 to 80% by weight, in particular from 0 to 60% by weight and with particular preference from 0 to 40% by weight of at least one further monomer. Monomers which can be used have already been specified above in connection with polymer (A1). Preference is given to methyl methacrylate, n-butyl methacrylate, t-butyl methacrylate, methyl acrylate, ethyl acrylate, n-butyl acrylate, 2-ethylhexyl acrylate, styrene, acrylamide, acrylonitrile and vinyl acetate.

The polymerization procedure and auxiliaries have already been described above in connection with polymer (A1).

In addition to the polymerization techniques specified above in connection with polymer (A1), the polymers (A2) can also be obtained by a solution polymerization.

The use of aqueous free-radical solution polymerization gives water-soluble polymers and copolymers A2, preferably starting from 50 to 100% by weight of the abovementioned carboxylic acids, carboxylic anhydrides, monoesters or a mixture of two or more of these compounds. Their weight-average molecular weight is generally in the range from 500 to 1,000,000, preferably from 2000 to 200,000. The K values of the polymers are generally in the range from 10 to 150, preferably from 12 to 100 (measured in 1% strength by weight solution in water). The solids content is generally in the range from 10 to 80% by weight, preferably from 20 to 65% by weight. The polymerization can be conducted at from 20 to 300° C., preferably from 60 to 200° C. The solution polymerization is carried out in a customary manner, as described, for example, in EP-A-75 820 or DE-A-36 20 149.

The polymer (A2) can also be obtained by grafting maleic acid or maleic anhydride, or a monomer mixture comprising maleic acid or maleic anhydride, onto a graft base. Examples of suitable graft bases are monosaccharides, oligosaccharides, modified polysaccharides and alkyl polyglycol ethers. Examples of such graft polymers are described in DE-A-4 003 172 and EP-A-116 930.

The polymer A2 can also be prepared in a two-stage procedure directly prior to the preparation of the polymer A1 in the same reaction vessel.

The long-chain amine is preferably an amine of the formula $$R^xNR^yR^z$$

where $R^x$ is $C_6$–$C_{22}$-alkyl, $C_6$–$C_{22}$-alkenyl, aryl-$C_6$–$C_{22}$-alkyl or aryl-$C_6$–$C_{22}$-alkenyl and the alkenyl can have 1 to 3 double bonds, $R^y$ and $R^z$, which may be identical or different, are H, $-(CH_2CH_2O)_n-H$, where n is 1 to 25, or $C_5$–$C_7$-cycloalkyl which is unsubstituted or substituted by at least one hydroxyl, or are as defined for $R^x$ or together are a 5- to 7-membered ring which may contain at least one further heteroatom selected from O, N and S.

Preferred radicals $R^x$ are those having 8 to 22 carbons. The long-chain amine is in particular selected from compounds of the above formula in which $R^x$ is $C_6$–$C_{22}$-alkyl or $C_6$–$C_{22}$-alkenyl (having preferably 1 or 2 double bonds) and $R^y$ and $R^z$, which are identical or different, are H or $-(CH_2CH_2O)_n-H$. n is preferably 1 to 20, especially 1 to 10.

Examples of suitable long-chain amines are those ethoxylated amines marketed by AKZO under the name "Ethomeen" such as Ethomeen C/15, a polyoxyethylene-(5)-cocoamine, or Ethomeen S/12, an oleylbis (2-hydroxyethyl) amine, or Ethomeen T/25, a polyoxyethylene-(15)-tallowamine.

Products of this kind are also available from other manufacturers. Further examples which may be mentioned at this point are Lutensol FA 12 from BASF, a polyoxyethylene-(12)-oleylamine, or Noramox 0.7 from Pierrefitte-Auby, a polyoxyethylene-(7)-oleylamine.

Ethoxylated long-chain mono- and diamines are preferred. For the preparation of the novel compositions, however, it is also possible to use long-chain primary, secondary or tertiary aliphatic amines. Examples of these are the AKZO products Armeen DMOD (oleyldimethylamine), Armeen M2C (dicocomethylamine), Armeen NCMD (N-cocomorpholine), Armeen 2C (dicocoamine) or Armeen 12D (n-dodecylamine).

The composition can if desired also include at least one alkanolamine having at least two hydroxyls. The addition of the alkanolamine brings about more rapid curing of the novel compositions at a given curing temperature, or curing at a lower temperature with a predetermined curing time. In addition, adding an alkanolamine improves the film-forming capacity of a composition.

Suitable alkanolamines are those of the formula:

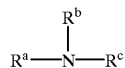

where $R^a$ is H, $C_1$–$C_5$-alkyl or $C_1$–$C_{10}$-hydroxyalkyl and $R^b$ and $R^c$ are $C_1$–$C_{10}$-hydroxyalkyl.

With particular preference, $R^b$ and $R^c$ independently are a $C_2$–$C_5$-hydroxyalkyl and $R^a$ is H, $C_1$–$C_5$-alkyl or $C_2$–$C_5$-hydroxyalkyl.

Examples of alkanolamines are diethanolamine, triethanolamine, diisopropanolamine, triisopropanolamine, methyldiethanol amine, butyldiethanolamine and methyldiisopropanolamine. Triethanolamine is particularly preferred.

Also suitable are alkanolamines selected from water-soluble, linear or branched aliphatic compounds which comprise per molecule at least two functional amino groups of type (a) or (b)

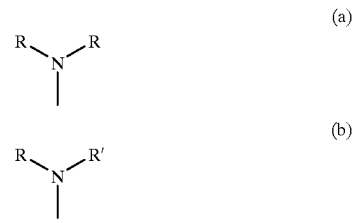

where R is hydroxyalkyl and R' is alkyl. Such compounds preferably comprise at least one compound of the formula I:

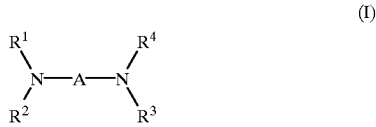

where

A is $C_2$–$C_{18}$-alkylene which is unsubstituted or substituted by one or more groups selected independently from alkyl, hydroxyalkyl, cycloalkyl, OH and $NR^6R^7$, where $R^6$ and $R^7$ independently are H, hydroxyalkyl or alkyl, and uninterrupted or interrupted by one or more oxygens and/or $NR^5$ groups, where $R^5$ is H, hydroxyalkyl, $(CH_2)_nNR^6R^7$, where n is 2 to 5 and $R^6$ and $R^7$ are as defined above, or alkyl, which in turn is interrupted by one or more $NR^5$ groups where $R^5$ is as defined above and/or is substituted by one or more $NR^6R^7$ groups where $R^6$ and $R^7$ are as defined above; or A is a radical of the formula:

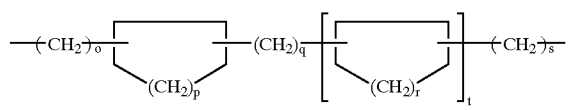

where o, q and s independently are 0 or an integer from 1 to 6, p and r independently are 1 or 2 and t is 0, 1 or 2, where the cycloaliphatic radicals can also be substituted by 1, 2 or 3 alkyls, and $R^1$, $R^2$ and $R^3$ and $R^4$ independently are H, hydroxyalkyl, alkyl or cycloalkyl, the compounds having at least two or preferably at least three hydroxyalkyls per molecule.

Particular preference is given to:
(1) compounds of the formula Ia

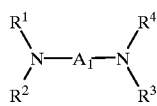

where
A$_1$ is C$_2$–C$_{12}$-alkylene which is unsubstituted or substituted by at least one alkyl and/or at least one NR$^6$R$^7$ group where R$^6$ and R$^7$ independently are alkyl or hydroxyalkyl, and
R$^1$, R$^2$, R$^3$ and R$^4$ independently are hydroxyalkyl or H, or one of R$^1$ and R$^2$ and/or one of R$^3$ and R$^4$ is alkyl or cycloalkyl.

Particularly useful compounds of this type are those of the following formulae:

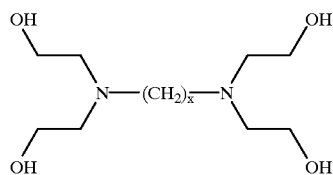

where x is 2 to 12, especially 2, 3, 6, 8, 10 or 12,

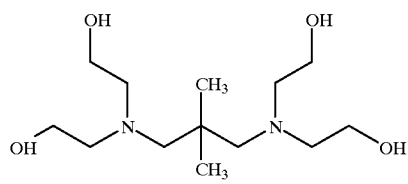

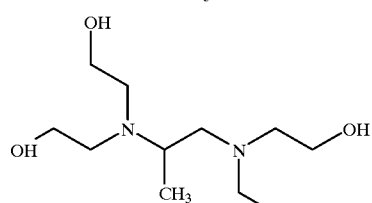

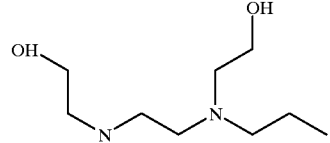

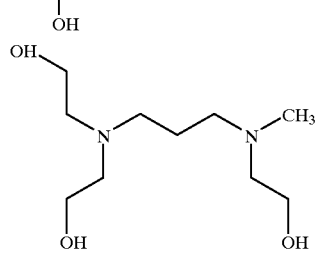

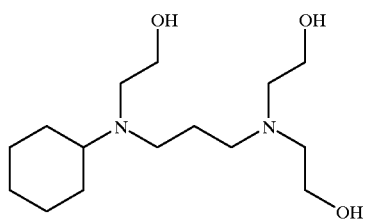

Compounds of the formula Ia also include the aminals of the formula

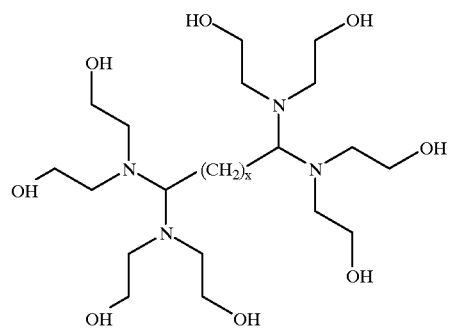

x = 1–12

(2) Compounds of the formula Ib

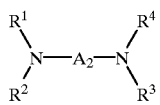

where
A$_2$ is C$_2$–C$_8$-alkylene which is interrupted by at least one group NR$^5$ where R$^5$ (or each R$^5$ independently) is hydroxyalkyl or alkyl, and
R$^1$, R$^2$, R$^3$ and R$^4$ independently are hydroxyalkyl or H.

The radical A$_2$ is preferably interrupted by one or two groups NR$^5$. Particularly useful compounds of this type are those of the following formulae:

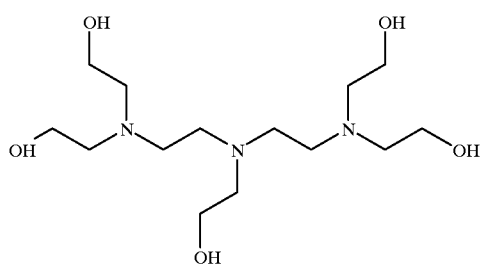

-continued

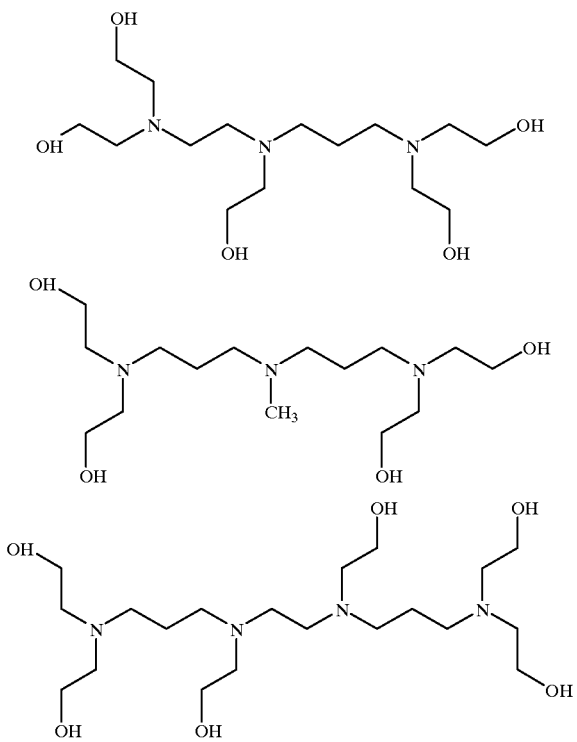

(3) Compounds of the formula Ic:

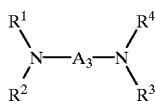

where

A$_3$ is C$_2$–C$_8$-alkylene which is interrupted by at least one group NR$^5$ where R$^5$ is H, hydroxyalkyl or CH$_2$CH$_2$NR$^6$R$^7$, R$^1$, R$^2$, R$^3$ and R$^4$ independently are alkyl which is uninterrupted or interrupted by at least one group NR$^5$ and/or unsubstituted or substituted by at least one group NR$^6$R$^7$, R$^5$ is H, hydroxyalkyl or —R$^8$NR$^6$R$^7$, and R$^6$ and R$^7$ independently are H, hydroxyalkyl or —R$^8$NR$^6$R$^7$, R$^8$ is an ethylene or propylene radical, and where (on average) at least 30%, in particular >60% and preferably >80% of the (hydroxyalkylatable) nitrogens carry a hydroxyalkyl.

The C$_2$–C$_8$-alkylene group is preferably interrupted by at least two groups NR$^5$. Particularly useful compounds of this type are reaction products of ethylene oxide with polyethyleneimines of different molecular weights, containing two or more structural units NR$^6$R$^7$ and NR$^5$. Polyethyleneimines which can be used are those whose weight-average molecular weight is in the range from 400 to 2,000,000. The diagrammatic formula below is intended to illustrate compounds of this type:

where

R$^5$ is H, hydroxyethyl or —R$^8$NR$^6$R$^7$ and R$^6$ and R$^7$ are H, hydroxyethyl or —R$^8$NR$^6$R$^7$ and R$^8$ is (CH$_2$)$_2$, in which on average >40%, especially >60% and with

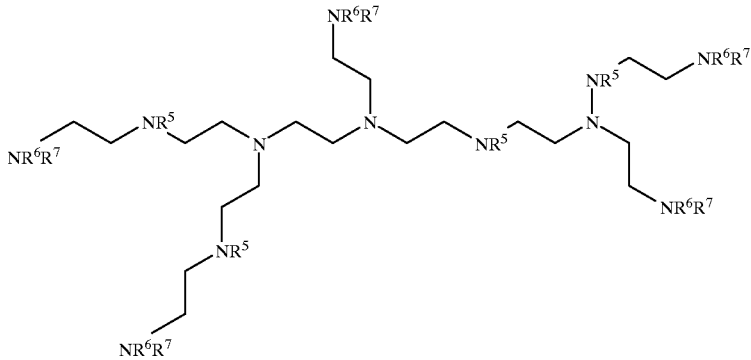

particular preference >80% of the ethoxylable NH functions of the polyethyleneimine have been reacted with ethylene oxide.

(4) Compounds of the formula Ie

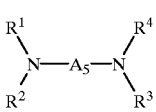

where

A$_5$ is C$_6$–C$_{18}$-alkylene which is interrupted by at least one group NR$^5$ where R$^5$ is (CH$_2$)$_n$NR$^6$R$^7$ or alkyl which is uninterrupted or interrupted by at least one group $NR^5$ where $R^5$ is $(CH_2)_nR^6R^7$ or alkyl and/or is unsubstituted or substituted by at least one group $NR^6R^7$,
n is 2 or 3 and
$R^1$, $R^2$, $R^3$, $R^4$, $R^6$ and $R^7$ independently are hydroxyalkyl or H.
Particularly useful compounds of this type are polyamines of the formulae:
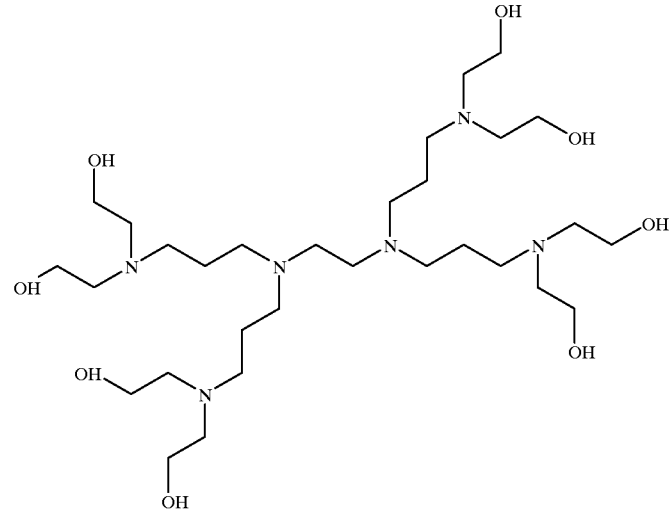
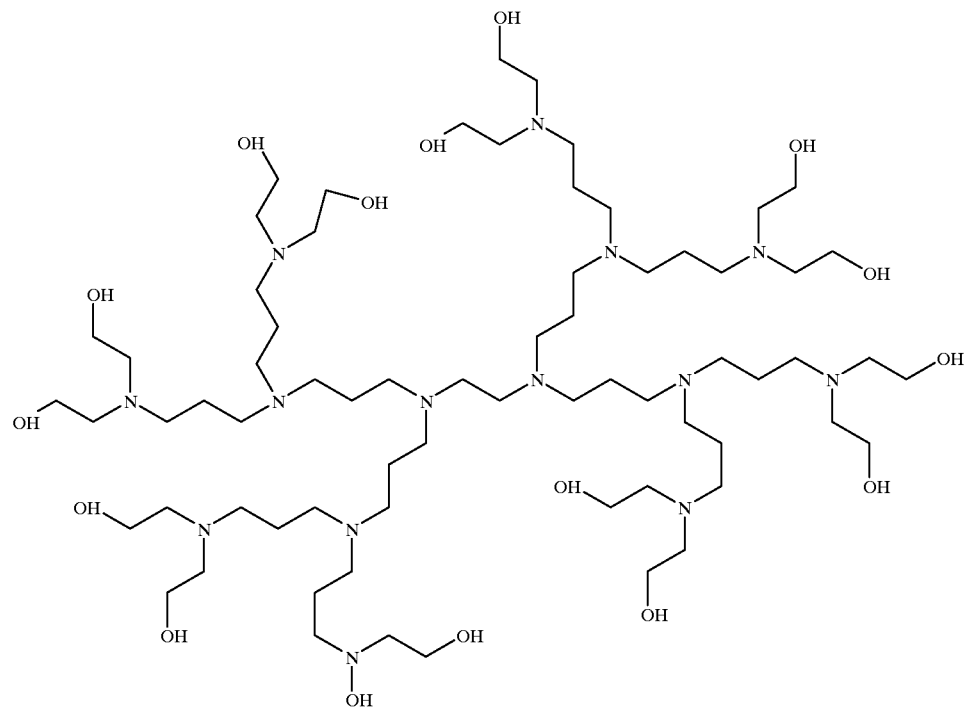

(5) Compounds of the formula If $$\text{R}^1\text{R}^2\text{N}-\text{A}_6-\text{N}\text{R}^3\text{R}^4 \quad (\text{If})$$

where $A_6$ is $C_2$–$C_{12}$-alkylene which is interrupted by at least one oxygen and $R^1$, $R^2$, $R^3$ and $R^4$ independently are hydroxyalkyl or H.

The alkylene chain is preferably interrupted by 1, 2 or 3 oxygens. Particularly useful compounds of this type are the compounds of the following formulae:

[Structure: bis(bis(2-hydroxyethyl)amino)propyl ether with one O]

[Structure: bis(bis(2-hydroxyethyl)amino)propyl ether with two O]

[Structure: bis(bis(2-hydroxyethyl)amino)propyl ether with three O]

(6) Compounds of the formula Ig, $$\text{R}^1\text{R}^2\text{N}-(\text{CH}_2)_o-[\text{ring}(\text{CH}_2)_p]-(\text{CH}_2)_q-[\text{ring}(\text{CH}_2)_r]_t-(\text{CH}_2)_s-\text{NR}^3\text{R}^4$$

where o, q and s independently are 0 or an integer from 1 to 6;

p and r independently are 1 or 2 and t is 0, 1 or 2, it being possible for the cycloaliphatic rings to be substituted by 1, 2 or 3 alkyls, and $R^1$, $R^2$, $R^3$ and $R^4$ independently are hydroxyalkyl or H.

Particularly useful compounds of this type are

[Structure: trimethylcyclohexane diamine tetraol derivative]

[Structure: dicyclohexylmethane diamine tetraol derivative]

[Structure: dimethyl-dicyclohexylmethane diamine tetraol derivative]

(7) Polyalkanolamines which are obtainable by condensing di- or trialkanolamines with themselves or with one another, alone or in the presence of alcohols or amines having a functionality of one or more.

An example of such oligomeric or polymeric compounds is the condensation product prepared from triethanol which is represented in idealized form by the following diagrammatic formula:

$$\text{R}_2\text{N}-\text{CH}_2-\text{CH}_2-\text{O}-\text{CH}_2-\text{CH}_2-\text{NR}_2$$

R = —CH$_2$—CH$_2$—OH or —CH$_2$—CH$_2$—O—CH$_2$—CH$_2$—NR$_2$

The compounds of the formula Ia, Ib (with the exception of the abovementioned aminals), Ic, Id, Ie, If and Ig can be prepared by reacting the corresponding polyamines with alkylene oxides.

The reaction of amines with alkylene oxides, especially ethylene oxide and propylene oxide, to the corresponding alkanolamines is known in principle. For this purpose the amines are reacted in the presence of a proton donor, generally water, with the alkylene oxides, generally at from 30 to 120° C., under atmospheric or superatmospheric pressure, preferably at from 1 to 5 bar, using about one equivalent of the alkylene oxide per N—H function to be alkoxylated. For near-complete alkoxylation it is possible to use a small excess of alkylene oxide, although it is preferred to employ the stoichiometric amount or even a slight deficit of the alkylene oxide relative to the N—H functions. Alkoxylation can be carried out with one alkylene oxide or with a mixture of two or more alkylene oxides. Alternatively, alkoxylation can be carried out with two or more alkylene oxides in succession.

Suitable catalysts other than water are alcohols or acids, although water is preferred (regarding the alkoxylation of amines cf. N.Schönfeld, Grenzflächenaktive Ethylenoxid-Addukte [Surface-active ethylene oxide adducts], pp. 29–33, Wissenschaftliche Verlagsgesellschaft mbH, Stuttgart 1976 or S. P. McManus et al., Synth. Comm. 3, (1973) 177).

The amount of water employed as catalyst and/or solvent may vary depending on requirements. In the case of liquid amines of low viscosity amounts of water from 1 to 5% are sufficient to catalyze the reaction. Solid, highly viscous or polymeric amines are advantageously reacted as solutions or dispersions in water; in this case the amount of water can be from 10 to 90%.

Under the conditions described for the alkoxylation in the presence of water, essentially only the —NH groups are reacted. Alkoxylation of the resulting OH groups does not, in general, take place, so that essentially a monoalkoxylation of the NH groups takes place (in other words, not more than 1 mol of alkylene oxide is added on per mol of NH).

The mean degree of alkoxylation of the active NH groups is preferably >75% in the case of compounds having less than nitrogens per molecule.

Examples of starting polyamines which can be used are α,ω-oligomethylenediamines, such as 1,2-ethylenediamine, 1,3-propanediamine, 1,6-hexamethylenediamine, 1,8-octamethylenediamine, 1,12-dodecamethylenediamine, 2,2-dimethyl-1,3-propanediamine, 1,2-propanediamine, 2-(ethylamino)ethylamine, 2-(methylamino)propylamine, N-(2-aminoethyl)-1,2-ethanediamine, N-(2-aminoethyl)-1,3-propanediamine, N-(2-aminoethyl)-N-methylpropanediamine, N,N-bis-(3-aminopropyl) ethylenediamine, 4-aminoethyl-1,8-octanediamine, 2-butyl-2-ethyl-1,5-pentanediamine, 2,2,4-trimethylhexamethylenediamine, 2-methylpentamethylenediamine, 1,3-diaminopentane, 3-isopropylaminopropylamine, triethylenetetramine or tetraethylenepentamine.

Oligo- and poly-N-(β-hydroxyethyl)amino compounds (aminals) can also be prepared by condensing aliphatic dialdehydes and diethanolamine.

Poly-N-(β-hydroxyethyl)amino compounds (8) are obtained as described, for example, in U.S. Pat. No. 4,505,839 and in DE-A-3 206 459 by thermal condensation of triethanolamine to give poly(triethanolamine) or by thermal condensation of alkanolamines to give hydroxyl-containing polyethers. The condensation of the alkanolamines can also be carried out, as described in DE-A-1 243 874, in the presence of primary or secondary amines or alcohols having a functionality of one or more. Depending on the condensation conditions the molecular weight of these products and thus the viscosity can be varied within a broad range.

The weight-average molecular weights of these polycondensates are usually from 200 to 100,000.

The compounds of the formulae Ie can be prepared by alkoxylation from what are known as dendrimer polyamines, whose synthesis by Michael addition of aliphatic diamines onto acrylonitrile and subsequent catalytic hydrogenation is described in WO 93/14147. One example of such compounds is the hydrogenated adduct of 4 mol of acrylonitrile and ethylenediamine. This hexamine having 4 primary aminos can be reacted further in a similar manner to give the N-14 amine having 8 primary aminos. Instead of ethylenediamine, other aliphatic di- and polyamines can also be employed.

Amino-containing polymers such as polyethyleneimine can also be reacted with ethylene oxide in aqueous solution to form useful poly-N-(β-hydroxyethyl)amino compounds, the degree of conversion of the NH functions present being generally >40%, especially >60% and preferably >80%. The preparation of polyethyleneimine is general knowledge. Polyethyleneimines in the molecular weight range $M_w$=800 to 2,000,000, for example, are obtainable from BASF under the name Lupasol®. Polyethyleneimines generally consist of branched polymer chains and therefore contain primary, secondary and tertiary aminos. Their ratio is usually about 1:2:1. At very low molecular weights, however, higher proportions of primary aminos are also possible. Also suitable for this application are substantially linear polyethyleneimines which are obtainable by special preparation techniques.

Polymeric alkyleneimines having primary and/or secondary aminos, which following alkoxylation can be used in the novel compositions, are described in "Encyclopedia of Polymer Science and Engineering", H. Mark (Editor), Revised Edition, Volume 1, pp. 680–739, John Wiley & Sons Inc., New York, 1985.

It is also possible to prepare hydroxyalkyl-substituted polyalkyleneimines by polymerizing N-hydroxyalkylaziridines.

Alkoxylated allylamine polymers and copolymers can also be used in the novel compositions.

The compounds of the formula If can be prepared starting from oxamines, such as 4,7-dioxadecane-1,10-diamine, 4,9-dioxadecane-1,12-diamine, 4,11-dioxatetradecane-1,14-diamine, 4, 9-dioxadodecane-1,12-diamine and 4,7,10-trioxatridecane-1,13-diamine. Other suitable starting amines are polyoxyalkylenamines, which are marketed by Huntsman under the name Jeffamine®. Examples of these are the diamines Jeffamine D-230, Jeffamine-D-400, Jeffamine D-2000, Jeffamine D-4000, Jeffamine ED-600, Jeffamine ED-900, Jeffamine ED-2001 and Jeffamine EDR-148 and the triamines Jeffamine T-403, Jeffamine T-3000 and Jeffamine T-5000.

Reaction products of aromatic polyamines with alkylene oxide are also suitable in principle for use in the novel compositions.

The polymers (A1) and (A2) are preferably employed in a weight ratio of from 5:1 to 1:5 and with particular preference from 3:1 to 1:3 (based on nonvolatile fractions).

The weight ratio of polymer (A2) to long-chain amine is from 20:1 to 2:1 (based on nonvolatile fractions), preferably from 10:1 to 3:1.

The weight ratio of polymer (A2) to alkanolamine (if present) is preferably from 100:1 to 1:1, especially from 50:1 to 2:1 and, with particular preference, from 30:1 to 2.5:1 (based in each case on nonvolatile fractions).

Particularly preferred proportions are as follows:

40–60 parts by weight of polymer (A1)

20–40 parts by weight of polymer (A2)

6–10 parts by weight of long-chain amine, and if used

0–15 parts by weight of alkanolamine.

The alkanolamine is preferably added to the novel composition after the preparation. It can be added in undiluted form or as an aqueous solution. An alternative possibility is to prepare the novel composition in the presence of an alkanolamine.

The pH of the novel compositions is from 0 to 9, preferably from 0.5 to 6, with particular preference from 1 to 4. A low pH favors the heat curing of the compositions.

At a content of active ingredients of 40% by weight, the viscosity of the novel aqueous compositions is generally in the range from 10 to 100,000 mPa.s, measured in a rotary viscometer in accordance with DIN 53019 at 23° C. and at a shear rate of 250 s$^{-1}$. Preference is given to viscosities of from 20 to 20,000 mPa.s, especially from 30 to 5000 mPa.s.

The novel compositions have a nonvolatile content in the range from 20 to 75% by weight, preferably from 40 to 70% by weight.

The novel compositions may include a reaction accelerator but preferably do not. Examples of suitable reaction accelerators are alkali metal hypophosphites, phosphites, polyphosphates and dihydrogenphosphates, polyphosphoric acid, hypophosphoric acid, phosphoric acid, alkylphosphinic acid or oligomers or polymers of these salts and acids.

Further suitable catalysts are strong acids such as sulfuric and p-toluenesulfonic acids. Also suitable are polymeric sulfonic acids, such as poly(acrylamido-2-methylpropanesulfonic acid), poly(vinylsulfonic acid), poly (p-styrenesulfonic acid), poly(sulfopropyl methacrylate) and polymeric phosphonic acids such as poly(vinylphosphonic acid), for example, and also copolymers derived therefrom with the above-described comonomers.

It is additionally possible to incorporate the acceleration-inducing sulfonic acids or phosphonic acids into the acid-containing polymer (A2) by using the corresponding monomers, such as acryloamido-2-methylpropanesulfonic acid, vinylsulfonic acid, p-styrenesulfonic acid, sulfopropyl methacrylate or vinylphosphonic acid, as comonomer when preparing the polymeric carboxylic acids.

Further suitable catalysts are organotitanates and organozirconates, such as triethanol titanate, titanium chelate ETAM and tetrabutyl zirconate, which are marketed, for example, by Hüls.

In addition, the novel compositions may depending on their intended use comprise customary additives, such as bactericides or fungicides, for example. In addition, they may comprise hydrophobicizing agents for increasing the water resistance of the treated substrates. Suitable hydrophobicizing agents are customary aqueous paraffin dispersions or silicones. The compositions may also include wetting agents, thickeners, plasticizers, retention agents, pigments and fillers.

Finally, the novel compositions can comprise customary agents providing protection against fire, such as aluminum silicates, aluminum hydroxides, borates and/or phosphates.

In many cases the compositions also comprise coupling reagents, such as alkoxysilanes, an example being 3-aminopropyltriethoxysilane, soluble or emulsifiable oils as lubricants and dust binders, and also wetting auxiliaries.

The novel compositions can also be employed in a blend of other binders such as, for example, urea-, melamine- or phenyl-formaldehyde resins, and with epoxy resins.

The novel compositions are formaldehyde-free. Formaldehyde-free means that the novel compositions contain no substantial amounts of formaldehyde and also that on drying and/or curing no substantial amounts of formaldehyde are released. In general, the formaldehyde content of the compositions is <100 ppm. The compositions make it possible to prepare shaped articles requiring a short curing time, and give the shaped articles excellent mechanical properties.

The novel heat-curable, formaldehyde-free compositions are essentially uncrosslinked in use and are therefore thermoplastic. If necessary, however, a small degree of pre-crosslinking can be established by using, for example, monomers having two or more polymerizable groups.

On heating, the water in the composition evaporates and the composition cures. These processes may take place in succession or simultaneously. By curing is meant in this context the chemical alteration of the composition: for example, crosslinking by formation of covalent bonds between the various constituents of the compositions, formation of ionic interactions and clusters, formation of hydrogen bonds. Curing may also involve physical changes in the binder, such as phase transformations or phase inversion.

Curing takes place at from 75 to 250° C., preferably from 90 to 200° C., and, with particular preference, from 100 to 180° C. The duration and level of heating influence the degree of curing. An advantage of the novel compositions is that they can be cured at comparatively low temperatures.

Curing may also take place in two or more stages. For instance, in a first step the curing temperature and time can be chosen so that only a low degree of curing is obtained, and substantially complete curing takes place in a second step. This second step may be effected in spatial and temporal separation from the first step. This enables the novel compositions to be used, for example, to produce semifinished goods, impregnated with binder, which can be shaped and cured to completion at a different site.

The compositions are used in particular as binders for the production of shaped articles made from fibers, slivers or chips, which can be of renewable raw materials or of synthetic or natural fibers, for example from clothing wastes. As renewable raw materials mention may be made in particular of sisal, jute, flax, coconut fibers, kenaf, banana fibers, hemp and cork. Wood fibers or wood chips are particularly preferred.

The shaped articles preferably have a density of from 0.2 to 1.4 g/cm$^3$ at 23° C.

Suitable shaped articles are, in particular, sheets and irregularly contoured parts. Their thickness is generally at least 1 mm, preferably at least 2 mm, and their surface area is typically from 200 to 200,000 cm$^2$. Particularly suitable such articles are interior automotive parts, such as interior door trim, dashboards, parcel shelves.

The amount by weight of the binder used is generally from 0.5 to 40% by weight, preferably from 1 to 30% by weight (in terms of binder solids), based on the substrate (fibers, slivers or chips).

The fibers, slivers or chips can be coated directly with the binder or mixed with the aqueous binder. The viscosity of the aqueous binder is preferably established (especially in the case of the production of shaped articles from wood fibers or wood chips) at from 10 to 10,000, more preferably from 50 to 5000 and, with very particular preference, from 100 to 2500 mPa.s (DIN 53019, rotary viscometer 250 s$^{-1}$).

The mixture of fibers, slivers and chips and the binder can be initially dried at from 10 to 150° C., for example, and then pressed at from 50 to 250° C., preferably from 100 to 240° C. and, with particular preference, from 120 to 225° C. and at pressures generally from 2 to 1000 bar, preferably from 10 to 750 bar and, with particular preference, from 20 to 500 bar to give the shaped articles.

The binders are particularly suitable for producing wood-base materials such as wood chipboards and wood fiberboards (cf. Ullmanns Encyclopädie der technischen Chemie, 4th edition 1976, Volume 12, pp. 709–727), which can be produced by gluing disintegrated wood such as wood chips and wood fibers, for example. The water resistance of woodbase materials can be enhanced by adding to the binder a customary commercial aqueous paraffin dispersion or other hydrophobicizing agents, or adding said hydrophobicizing agents beforehand or subsequently to the fibers, slivers or chips.

Chipboard production is widely known and is described, for example, in H. J. Deppe, K. Ernst, Taschenbuch der Spanplattentechnik, 2nd edition, Verlag Leinfelden 1982.

It is preferred to use chips whose average size is from 0.1 to 4 mm, in particular from 0.2 to 2 mm, and which contain less than 6% by weight of water. However, it is also possible to employ considerably coarser chips and those with a higher moisture content. The binder is applied with great uniformity to the wood chips, the weight ratio binder solids/wood chips preferably being from 0.02:1 to 0.3:1. Uniform distribution can be achieved, for example, by spraying the binder in finely divided form onto the chips.

The glued wood chips are then spread out to form a layer with a highly uniform surface, the thickness of the layer being guided by the desired thickness of the finished chipboard. The scattered layer is pressed at from 100 to 250° C., preferably from 120 to 225° C., by applying pressures of usually from 10 to 750 bar, to form a board. The required press times may vary within a wide range and are in general from 15 seconds to 30 minutes.

The wood fibers of suitable quality required to produce medium-density fiberboard (MDF) panels from the binders can be prepared from bark-free wood chips by grinding in special mills or refiners at about 180° C.

For gluing, the wood fibers are generally swirled up in a stream of air and the binder is sprayed into the stream of fibers thus generated ("blow-line" process). The proportion of wood fibers to binder, based on the dry-matter content or solids content, is usually from 40:1 to 2:1, preferably from 20:1 to 4:1. The glued fibers are dried in the stream of fibers at from 130 to 180° C., for example, spread out to form a fiber web and pressed at pressures from 10 to 50 bar to form sheets or shaped articles.

The glued wood fibers can also be processed, as described in DE-A 2 417 243, for example, into a transportable fiber mat. This semifinished product can then be processed further in a second, temporally and spatially separate step to form sheets or shaped articles, such as motor vehicle interior door trim panels.

Other natural fiber substances as well, such as sisal, jute, hemp, flax, coconut fibers, banana fibers and other natural fibers, can be processed with the binders to form sheets and shaped parts. The natural fiber materials can also be used in mixtures with plastic fibers, such as polypropylene, polyethylene, polyesters, polyamides or polyacrylonitrile. In this case the plastic fibers may also function as cobinders in addition to the novel binder. The proportion of plastic fibers is preferably less than 50% by weight, in particular less than 30% by weight and, with very particular preference, less than 10% by weight, based on all chips, slivers or fibers. The fibers can be processed by the methods used for the wood fiberboards. Alternatively, preformed natural fiber mats can be impregnated with the novel binders, with or without the addition of a wetting auxiliary. The impregnated mats are then pressed, in the binder-moist or predried state, at from 100 to 250° C. and at pressures from 10 to 100 bar, for example, to form sheets or shaped parts.

The substrates impregnated with the novel binders preferably have a residual moisture content, on pressing, of 3–20% by weight, based on the substrate to be bound.

The shaped articles obtained in accordance with the invention feature low water absorption, little increase in thickness (swelling) after storage in water, and good strength and are formaldehyde-free.

In addition, the novel compositions can be used as binders for coating and impregnating compositions for sheets of organic and/or inorganic fibers, nonfibrous mineral fillers, and also starch and/or aqueous polymer dispersions. The coating and the impregnating compositions give the sheets a high flexural modulus. The production of such sheets is known.

Sheets of this kind are usually employed as soundproofing panels. The thickness of the sheets is usually in the range from about 5 to 30 mm, preferably from 10 to 25 mm. The edge length of the square or rectangular sheets is usually in the range from 200 to 2000 mm.

In addition, the novel compositions may comprise the auxiliaries customary in coating and impregnation technology. Examples of such auxiliaries are finely divided inert fillers, such as aluminum silicates, quartz, precipitated or pyrogenic silica, light and heavy spar, talc, dolomite or calcium carbonate; color-imparting pigments, such as titanium white, zinc white, iron oxide black, etc., foam inhibitors, such as modified dimethylpolysiloxanes, and adhesion promoters and preservatives.

The components of the novel composition are present in the coating composition in general in an amount from 1 to 65% by weight. The proportion of the inert fillers is generally from 0 to 85% by weight, while that of water is at least 10% by weight.

The compositions are employed in a customary manner by application to a substrate, for example by spraying, rolling, pouring or impregnating. The amounts applied, based on the dry content of the composition, are in general from 2 to 100 g/m$^2$.

The amounts of additives to be employed are known to the skilled worker and depend in each individual case on the desired properties and on the intended use.

The novel compositions are also useful as binders for insulating materials made from inorganic fibers, such as mineral fibers and glass fibers. Such insulating materials are produced industrially by spinning from melts of the corresponding mineral raw materials: see U.S. Pat. No. 2,550,465, U.S. Pat. No. 2,604,427, U.S. Pat. No. 2,830,648, EP-A-354 913 and EP-A-567 480. The composition is then sprayed onto the freshly produced and still hot inorganic fibers. Then the water evaporates substantially and the composition remains adhering, in an essentially uncured state, as a viscous mass on the fibers. A continuous, binder-containing fiber mat produced in this way is transported on through a curing oven by means of suitable conveyor belts. There, the mat cures at from about 100 to 200° C. to form a rigid matrix. After curing, the insulating mats are finished appropriately.

The predominant proportion of the mineral or glass fibers used in the insulating materials has a diameter in the range from 0.5 to 20 µm and a length in the range from 0.5 to 10 cm.

The novel compositions are suitable, moreover, as binders for fiber webs.

Examples of fiber webs are webs of cellulose, cellulose acetate, esters and ethers of cellulose, cotton, hemp, animal fibers, such as wool or hair, and especially nonwovens of synthetic or inorganic fibers, for example aramid, carbon, polyacrylonitrile, polyester, mineral, PVC or glass fibers.

When used as binders for fiber webs the novel compositions may, for example, include the following additives: silicates, silicones, boron-containing compounds, lubricants, wetting agents.

Glass fiber webs are preferred. The unbonded fiber webs (raw fiber webs), especially those of glass fibers, are bonded—that is, consolidated—by the novel binder.

The novel binder is preferably applied to the raw fiber web, by coating, impregnating or soaking, for example, in a fiber/binder (solids) weight ratio of from 10:1 to 1:1, more preferably from 6:1 to 3:1.

In this case the binder is preferably used in the form of a dilute aqueous formulation containing from 95 to 40% by weight of water.

Application of the binder to the raw fiber web is generally followed by drying at, preferably, from 100 to 400° C., especially from 130 to 280° C., and, with very particular preference, at from 130 to 230° C., over a period of preferably 10 seconds to 10 minutes, in particular from 10 seconds to 3 minutes.

The bonded fiber web obtained has high strength in the dry and wet states. In particular, the novel binders permit short drying times and also low drying temperatures.

The bonded fiber webs, especially glass fiber webs, are suitable for use as or in roofing membranes, as base materials for wallpapers or as inliners or base material for floor coverings made, for example, from PVC.

In the case of use as roofing membranes the bonded fiber webs are generally coated with bitumen.

The aqueous compositions of this invention can also be used to produce foamed boards or shaped articles. To this end, the water present in the composition is initially removed at temperatures of <100° C. down to a level of <20% by weight. The resulting viscous composition is then foamed at temperatures of >100° C., preferably at from 120 to 300° C. The residual water still present in the mixture and/or the gaseous products formed in the course of the curing reaction, for example, may act as blowing agents. Alternatively, commercial blowing agents can be added. The resulting crosslinked polymer foams can be used, for example, for thermal and acoustic insulation.

The compositions of this invention can be used for impregnating paper, which is subsequently dried under gentle conditions, to produce laminates, for example for decorative applications, according to known processes. In a second step these laminates are applied to the substrate to be coated, by a lamination with heat and pressure, under conditions chosen such that the binder will cure.

The compositions of this invention can additionally be used to produce sandpaper and other abrasives by the production techniques customarily practiced with phenolic resin as binder. In the production of sandpapers, a layer of the binders of the invention, as base binders, is first of all applied (judiciously 10 g/m$^2$) to an appropriate backing paper. The desired amount of particulate abrasive is scattered into the wet base binder. After initial drying a binder topcoat is applied (e.g. 5 g/m$^2$). The paper coated in this way is then cured by heating at 170° C. for 5 minutes.

The hardness and flexibility of the composition can be set at the desired level by way of the composition of polymer A1.

The compositions of the invention are also suitable as formaldehyde-free core sand binders for producing casting molds and cores for metal casting according to the conventional processes.

The examples which follow illustrate the invention.

The nonvolatile fractions were determined in a convection drying oven from the weight loss of a 1 g sample dried at 120° C. for two hours.

The viscosity of the compositions was determined in a Rheomat from Physica at a shear rate of 250 s$^{-1}$ in accordance with DIN 53019 at 23° C.

The K value of the polymers A2 was determined in 1% strength aqueous solution.

The weight-average particle size of the novel polymers was determined by the method of quasielastic light scattering. For this the novel compositions were diluted to a solids content of 0.01% by weight using a 2% strength sodium lauryl sulfate solution and measured by means of an Autosizer 2C from Malvern.

EXAMPLE 1

A 4 l glass vessel with anchor stirrer (120 rpm) was charged with 510 g of water, 960 g of a 50% strength by weight aqueous solution of a compolymer composed of 50 parts by weight of acrylic acid units and 50 parts by weight of maleic acid units (pH=0.8; K value=12) and 300 g of a 40% strength by weight aqueous solution of ethoxylated oleylmonoamine (mean degree of ethoxylation=12). At an internal temperature of 85° C., 5% by weight of the total amount of a feedstream 1 and 10% by weight of the total amount of a feedstream 2 were added. The reaction mixture was initially polymerized at 85° C. for 10 minutes. Subsequently, at 85° C., the remainder of feedstream 1 was supplied continuosly over the course of 3 h and the remainder of feedstream 2 was supplied continuously over the course of 3.5 h, the two feedstream being kept spatially separate. The polymer thus prepared contains 49.8% of nonvolatile components and has a pH of 1.6. The particle size is 58 nm.

| Feedstream 1: | 400 g of styrene |
| --- | --- |
|  | 360 g of methyl methacrylate |
|  | 40 g of acetacetoxyethyl methacrylate |
| Feedstream 2: | 200 g of water |
|  | 8 g of sodium peroxodisulfate |

EXAMPLE 2

| Initial charge: | 1200 g of water |
| --- | --- |
|  | 950 g of Sokalan PM 10S (from BASF), a 50% strength solution of a maleic acid copolymer (pH = 2, K value = 10) |
|  | 300 g of a 40% strength by weight aqueous solution of ethoxylated oleylmonoamine (mean degree of ethoxylation = 12) |
| Feedstream 1: | 400 g of styrene |
|  | 360 g of methyl methacrylate |
|  | 40 g of hydroxyethyl acrylate |
| Feedstream 2: | 200 g of water |
|  | 8 g of 2,2'-azobis(2-amidinopropane) dihydrochloride |

Procedure as in Example 1. The resulting composition is adjusted with 25% strength by weight aqueous ammonia solution to a pH of 4.0. It contains 39.4% of nonvolatile components

EXAMPLE 3

| Initial charge: | 420 g of water |
| --- | --- |
|  | 960 g of the 50% strength by weight copolymer solution from Example 1 |
| Feedstream 1: | 400 g of water |
|  | 300 g of a 40% strength by weight aqueous solution of ethoxylated oleylmonoamine (mean degree of ethoxylation = 12) |
|  | 400 g of styrene |
|  | 400 g of methyl methacrylate |
| Feedstream 2: | 200 g of water |
|  | 8 g of 2,2'-azobis(2-amidinopropane) dihydrochloride |

Procedure as in Example 1.

In this case the feedstream 1, which is an emulsion, was stirred continuously at 100 rpm. The polymer thus prepared contains 45.4% of nonvolatile components and has a pH of 1.9. The particle size is 142 nm.

EXAMPLE 4

| Initial charge: | 10 g of water |
| --- | --- |
| | 960 g of the 50% strength by weight aqueous copolymer solution from Example 1 |
| | 300 g of a 40% strength by weight aqueous solution of ethoxylated oleylmonoamine (mean degree of ethoxylation = 12) |
| Feedstream 1: | 400 g of styrene |
| | 360 g of methyl methacrylate |
| | 40 g of hydroxyethyl acrylate |
| Feedstream 2: | 200 g of water |
| | 8 g of sodium peroxodisulfate |

Procedure as in Example 1.

The polymer thus prepared contains 59.9% of nonvolatile components and has a pH of 1.5. The particle size is 112 nm.

EXAMPLE 5

To 1000 g of the polymer dispersion from Example 4 there was added, at room temperature and with stirring, a mixture of 60 g of triethanolamine and 60 g of water.

The blend thus prepared contains 58.8% of nonvolatile components and has a pH of 3.4.

EXAMPLE 6

| Initial charge: | 1260 g of water |
| --- | --- |
| | 960 g of the 50% strength by weight aqueous copolymer solution from Example 1 |
| | 300 g of a 40% strength by weight aqueous solution of ethoxylated oleylmonoamine (mean degree of ethoxylation = 12) |
| Feedstream 1: | 600 g of styrene |
| | 200 g of methyl methacrylate |
| | 40 g of hydroxyethyl acrylate |
| Feedstream 2: | 200 g of water |
| | 8 g of 2,2'-azobis(2-amidinopropane) dihydrochloride |

Procedure as in Example 1.

The polymer thus prepared contains 40.3% of nonvolatile components. It has a pH of 1.6 and a viscosity of 120 mPas. The particle size is 75 nm.

EXAMPLE 7

| Initial charge: | 1200 g of water |
| --- | --- |
| | 960 g of the 50% strength by weight aqueous copolymer solution from Example 1 |
| | 300 g of a 40% strength by weight aqueous solution of ethoxylated oleylmonoamine (mean degree of ethoxylation = 12) |
| Feedstream 1: | 400 g of n-butyl acrylate |
| | 76 g of styrene |
| | 24 g of methacrylic acid |
| Feedstream 2: | 200 g of water |
| | 8 g of sodium peroxodisulfate |

Procedure as in Example 1.

The polymer thus prepared contains 40.2% of nonvolatile components and has a pH of 1.8 and a viscosity of 140 mPas. The particle size is 64 nm.

EXAMPLE 8

To 1000 g of the polymer dispersion from Example 7 there was added, at room temperature and with stirring, a mixture of 63 g of a 77% strength by weight aqueous solution of ethoxylated diethylenetriamine (mean degree of ethoxylation=4.6) and 50 g of water.

The blend thus prepared contains 45.4% of nonvolatile components and has a pH of 3.1.

EXAMPLE 9

| Initial charge: | 790 g of water |
| --- | --- |
| | 960 g of a 50% strength by weight solution of polyacrylic acid (pH = 1.2, K value = 80) |
| | 200 g of a 40% strength by weight aqueous solution of ethoxylated oleylmonoamine (mean degree of ethoxylation = 12) |
| Feedstream 1: | 240 g of styrene |
| | 560 g of ethyl acrylate |
| Feedstream 2: | 200 g of water |
| | 8 g of 2,2'-azobis(2-amidinopropane) dihydrochloride |

Procedure as in Example 1.

The polymer thus prepared contains 39.3% of nonvolatile components and has a pH of 2.2 and a viscosity of 920 mPas. The particle size is 269 nm.

EXAMPLE 10

| Initial charge: | 300 g of water |
| --- | --- |
| | 13 mg of iron (II) sulfate |
| | 7 g of mercaptoethanol |
| Feedstream 1: | 235 g of acrylic acid |
| Feedstream 2: | 50 g of water |
| | 12 g of a 30% strength by weight aqueous hydrogen peroxide solution |

Feedstreams 1 and 2 were metered in simultaneously over the course of 1.5 hours at 60° C. After the end of the feeds, stirring was continued at 60° C. for 1 hour.

To the polymer solution thus prepared (K value=27) there were added

| 880 g of water |
| --- |
| 75 g of a 40% strength by weight aqueous solution of ethoxylated oleylmonoamine (mean degree of ethoxylation = 12) |

This mixture was heated to 85° C. Then, at an internal temperature of 85° C., 5% by weight of the total amount of a feedstream 3 and 10% by weight of the total amount of a feedstream 4 were added. The reaction mixture was initially polymerized at 85° C. for 10 minutes. Then, at 85° C., the remainder of feedstream 3 was supplied continuously over the course of 3 h and the remainder of feedstream 4 was supplied continuously over the course of 3.5 h, the two feedstreams being kept spatially separate.

| | |
|---|---|
| Feedstream 3: | 200 g of styrene |
| | 180 g of methyl methacrylate |
| | 560 g of hydroxyethyl acrylate |
| Feedstream 4: | 200 g of water |
| | 4 g of 2,2'-azobis(2-amidinopropane) dihydrochloride |

The polymer thus prepared contains 29.4% of nonvolatile components and has a pH of 1.6.

EXAMPLE 11

| | |
|---|---|
| Initial charge: | 520 g of water |
| | 960 g of the 50% strength by weight aqueous copolymer solution from Example 1 |
| | 300 g of a 40% strength by weight aqueous solution of ethoxylated oleylmonoamine (mean degree of ethoxylation = 12) |
| Feedstream 1: | 400 g of styrene |
| | 384 g of ethyl acrylate |
| | 16 g of Dynasylan MEMO (supplied by Huls, chemical name 3-methacryloyloxy-propyltrimethoxysilane) |
| Feedstream 2: | 200 g of water |
| | 8 g of 2,2'-azobis(2-amidinopropane) dihydrochloride |

Procedure as in Example 1.

The polymer thus prepared contains 48.9% of nonvolatile components and has a pH of 1.7.

COMPARATIVE EXAMPLE V1

(Composition Without Polymer A2)

| | |
|---|---|
| Initial charge: | 520 g of water |
| | 300 g of a 40% strength by weight aqueous solution of ethoxylated oleylmonoamine (mean degree of ethoxylation = 12) |
| | 10 g of 85% strength by weight aqueous phosphoric acid |
| Feedstream 1: | 400 g of styrene |
| | 360 g of methyl methacrylate |
| | 40 g of hydroxyethyl acrylate |
| Feedstream 2: | 200 g of water |
| | 8 g of 2,2'-azobis(2-amidinopropane) dihydrochloride |

Procedure as in Example 1.

The polymer thus prepared contains 49.5% of nonvolatile components and has a pH of 4.0 and a particle size of 77 nm.

COMPARATIVE EXAMPLE V2

(Composition Without Long-chain Amine)

| | |
|---|---|
| Initial charge: | 580 g of water |
| | 960 g of the 50% strength by weight aqueous copolymer solution from Example 1 |
| Feedstream 1: | 400 g of styrene |
| | 360 g of ethyl acrylate |
| | 40 g of hydroxyethyl acrylate |
| Feedstream 2: | 200 g of water |
| | 8 g of 2,2'-azobis(2-amidinopropane) dihydrochloride |

Procedure as in Example 1

In the course of polymerization there was severe formation of coagulum. A stable polymer dispersion was not obtained.

A) Testing as Binder for Natural Fiber Mats

Binders from the examples indicated are diluted by adding water to a nonvolatile content of 25%.

A fiber mat composed of a 1:1 mixture of jute and sisal fibers (mean basis weight 1200 g/m$^2$, residual moisture content 7%, manufactured by Braunschweiger Jute- und Flachs Industriebetriebs-GmbH) are impregnated using a padder roll with the 25% strength binder liquor such that, based on the dry fiber weight, 25% by weight of nonvolatile binder components are applied.

The impregnated fiber mats (35×30 cm) are dried in a convection drying oven at 80° C. to a residual moisture content of 10%, based on dry fibers, and are pressed using a hydraulic press at a temperature of 200° C. and a pressure of 1.5 N/mm$^2$ for two minutes.

The bending strength (BS) is measured using a three-point bending test in accordance with DIN 52352 at various temperatures (23, 60 and 100° C.).

The thickness swelling (TS) is determined as the relative increase in thickness of 2×2 cm sections of the pressed fiber mats after storage in water at 23° C. for 2 h or 24 h, respectively.

Climatic stability: 3×10 cm sections of the pressed fiber mats are stored in a controlled-climate (CC) cabinet at 8° C. and 90% relative humidity for 1 day or 7 days, respectively. The strength and decrease in strength of the test specimens is then evaluated relatively to one another by ratings (rating 1=very high strength to rating 5=very low strength)

| | | 1 | 2 | 3 | 4 | 6 | V1 |
|---|---|---|---|---|---|---|---|
| Sheet thickness | (mm) | 1.72 | 1.45 | 1.65 | 1.51 | 1.50 | 1.41 |
| Density | (g/cm$^3$) | 0.68 | 0.80 | 0.68 | 0.78 | 0.78 | 0.82 |
| BS 23° C. | (N/mm$^2$) | 24 | 39 | 31 | 42 | 35 | 42 |
| BS 60° C. | (N/mm$^2$) | 18 | 29 | 19 | 32 | 18 | 19 |
| BS 100° C. | (N/mm$^2$) | 12 | 23 | 12 | 19 | 16 | 7 |
| TS 2 h | (%) | 22 | 21 | 18 | 22 | 23 | 84 |
| TS 24 h | (%) | 28 | 24 | 24 | 25 | 31 | 100 |
| before CC storage | (rating) | 1 | 1 | 1–2 | 1 | 1 | 2 |
| CC storage 1d | (rating) | 1 | 1 | 2 | 1–2 | 1–2 | 3 |
| CC storage 7d | (rating) | 2 | 1 | 3 | 2 | 2 | 4–5 |

B) Testing as Binder for Cork Chips:

In a tumble mixer, 2.5 g of the 46.5% strength binder composition from Example 8 were added to 15 g of cork chips (bulk density 65 g/l, average size: 2 mm). The binder-impregnated cork chips were pressed in a 15×15 cm mold at 190° C. under a pressure of 1.5 N/mm² for 3 minutes to form sheets with a thickness of 2 mm.

The water absorption of the sheet after storage in water for 24 hours was 50% and its thickness swelling was 12%.

C) Testing as Binder for Finely Divided Mineral Materials and for Mineral Fibers and Glass Fibers 300 g of quartz sand H34 were mixed at room temperature with binder composition (5% by weight of dry binder, based on sand). The moist mixture was shaped into a test specimen (Fischer bar) measuring 17×2.3×2.3 cm and cured at 125° C. for 2 h.

The bending strength of the Fischer bars thus produced is determined in the dry state at 23° C., 60 and 100° C. in a type PFG strength tester with the testing apparatus PBV (from George Fischer, Schaffhausen/CH).

A further Fischer bar is stored for one hour in distilled water at 23° C. The bending strength in the wet state at 23° C. is determined.

|    | (N/mm²) | (N/mm²) | (N/mm²) | (N/mm²) |
|----|---------|---------|---------|---------|
| 7  | 770     | 560     | 390     | 300     |
| 9  | 930     | 550     | 345     | 250     |
| 10 | 810     | 640     | 290     | 280     |
| 11 | 660     | 610     | 620     | 230     |

D) Testing as Coating

The compositions were diluted to a nonvolatile content of 45% and knife coated onto a glass plate in a wet film thickness of 200 μm. The film was dried at room temperature for 24 h. The samples were then cured in a drying cabinet at the temperatures and for the times stated.

The pendulum hardness was determined by the method of König (DIN 53157) using a Labotron 5852 pendulum hardness instrument from Byk Mallinckrodt GmbH.

|           | Crosslinking time in min | Curing temperature 100° C. pendulum hardness in sec | Curing temperature 150° C. pendulum hardness in sect |
|-----------|-----------|-----------|-----------|
| Example 4 | 0  | 39 | 39  |
|           | 5  | 39 | 59  |
|           | 10 | 43 | 157 |
|           | 20 | 49 | 192 |
| Example 5 | 0  | 25 | 25  |
|           | 5  | 35 | 147 |
|           | 10 | 52 | 155 |
|           | 20 | 84 | 179 |

We claim:

1. A heat-curable aqueous composition, comprising at least one polymer (A1), which contains from 0 to 5% by weight of an α,β-ethylenically unsaturated mono- or dicarboxylic acid in copolymerized form and which is obtained by free-radical polymerization in the presence of
   (a) at least one polymer (A2) obtained by free-radical polymerization and containing from 15 to 100% by weight of an α,β-ethylenically unsaturated mono- or dicarboxylic acid in copolymerized form, and
   (b) at least one amine comprising at least one long chain having at least six carbons, wherein the weight ratio (based on solids) of polymer (A1) to polymer (A2) is from 7:1 to 1:7 and that of polymer (A2) to long-chain amine is from 20:1 to 2:1.

2. A composition as claimed in claim 1, where the polymer (A1) comprises in copolymerized form an α,β-ethylenically unsaturated $C_3$–$C_6$ mono or dicarboxylic acid.

3. A composition as claimed in claim 1, where the polymer (A1) comprises in copolymerized form as principal monomer an ester of acrylic or methacrylic acid with a $C_1$–$C_{12}$-alkanol, a vinylaromatic compound, a vinyl ester of a $C_2$–$C_{12}$ monocarboxylic acid, or a $C_1$–$C_{12}$-alkyl vinyl ether.

4. A composition as claimed in claim 1, where the polymer (A2) comprises in copolymerized form from 20 to 100% by weight of the α,β-ethylenically unsaturated mono- or dicarboxylic acid.

5. A composition as claimed in claim 1, where the polymer (A2) comprises in copolymerized form as mono- or dicarboxylic acid at least one compound selected from the group consisting of acrylic, methacrylic, crotonic, fumaric, maleic, 2-methylmaleic and itaconic acids.

6. A composition as claimed in claim 1, where the polymer (A2) comprises in copolymerized form other ethylenically unsaturated monomers selected from the group consisting of esters of (meth)acrylic acid with $C_1$–$C_{12}$ monoalcohols or dialcohols, vinylaromatic compounds, butadiene, vinyl esters of aliphatic $C_2$–$C_{12}$ monocarboxylic acids, $C_1$–$C_{12}$-alkyl vinyl ethers, (meth)acrylonitrile, (meth)acrylamide, N—$C_1$–$C_6$-alkyl(meth)acrylamides and N,N-di-$C_1$–$C_6$-alkyl(meth)acrylamides.

7. A composition as claimed in claim 1, where the long-chain amine is selected from the group consisting of compounds of the formula $$R^xNR^yR^z$$

where $R^x$ is $C_6$–$C_{22}$-alkyl, $C_6$–$C_{22}$-alkenyl, aryl-$C_6$–$C_{22}$-alkyl or aryl-$C_6$–$C_{22}$-alkenyl and the alkenyl can have 1 to 3 double bonds, $R^y$ and $R^z$, which may be identical or different, are H, $(CH_2CH_2O)_nH$, where n is 1 to 25, or $C_1$–$C_4$-alkyl or $C_5$–$C_7$-cycloalkyl which is unsubstituted or substituted by at least one hydroxyl, or are as defined for $R^x$ or together are a 5- to 7-membered ring which may contain at least one further heteroatom selected from O, N and S.

8. A composition as claimed in claim 7, where $R^x$ is $C_6$–$C_{22}$-alkyl or $C_6$–$C_{22}$-alkenyl and $R^y$ and $R^z$, are identical or different and are H or $(CH_2CH_2O)_nH$.

9. A composition as claimed in claim 1, which additionally comprises at least one alkanolamine having at least two hydroxyls.

10. A composition as claimed in claim 9, where the alkanolamine is selected from the group consisting of diethanolamine, triethanolamine and water-soluble, linear or branched aliphatic compounds which comprise per molecule at least two functional amino groups of type (a) or (b)

(a)

-continued

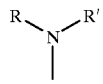
(b)

where R is hydroxyalkyl and R' is alkyl.

11. A composition as claimed in claim 10, where the alkanolamine comprises at least one compound of the formula I

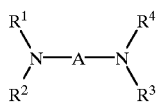
(I)

where

A is $C_2$–$C_{18}$-alkylene which is unsubstituted or substituted by one or more groups selected independently from alkyl, hydroxyalkyl, cycloalkyl, OH and $NR^6R^7$, where $R^6$ and $R^7$ independently are H, hydroxyalkyl or alkyl, and uninterrupted or interrupted by one or more oxygens and/or $NR^5$ groups, where $R^5$ is H, hydroxyalkyl, $(CH_2)_nNR^6R^7$, where n is 2 to 5 and $R^6$ and $R^7$ are as defined above, or alkyl, which in turn may be interrupted by one or more $NR^5$ groups where $R^5$ is as defined above and/or may be substituted by one or more $NR^6R^7$ groups where $R^6$ and $R^7$ are as defined above, and $R^1$, $R^2$ and $R^3$ and $R^4$ independently are H, hydroxyalkyl, alkyl or cycloalkyl.

12. A composition as claimed in claim 11, where the alkanolamine is selected from the group consisting of at least one compound of the formula Ia:

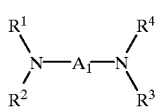
(Ia)

where $A_1$ is $C_2$–$C_{12}$-alkylene which is unsubstituted or substituted by at least one alkyl and/or at least one $NR^6R^7$ group where $R^6$ and $R^7$ independently are alkyl or hydroxyalkyl, and $R^1$, $R^2$, $R^3$ and $R^4$ independently are hydroxyalkyl or H, or one of $R^1$ and $R^2$ and/or one of $R^3$ and $R^4$ is alkyl or cycloalkyl.

13. A composition as claimed in claim 11, where the alkanolamine is selected from the group consisting of at least one compound of the formula Ib:

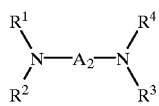
(Ib)

where $A_2$ is $C_2$–$C_8$-alkylene which is interrupted by at least one group $NR^5$ where $R^5$ (or each $R^5$ independently) is hydroxyalkyl or alkyl, and $R^1$, $R^2$, $R^3$ and $R^4$ independently are hydroxyalkyl or H.

14. A composition as claimed in claim 11, where the alkanolamine is selected from the group consisting of at least one compound of the formula Ic:

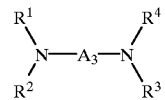
(Ic)

where $A_3$ is $C_2$–$C_8$-alkylene which is interrupted by at least one group $NR^5$ where $R^5$ is H. hydroxyalkyl or $CH_2CH_2NR^6R^7$, $R^1$, $R^2$, $R^3$ and $R^4$ independently are alkyl which is uninterrupted or interrupted by at least one group $NR^5$ and/or unsubstituted or substituted by at least one group $NR^6R^7$, $R^5$ is H, hydroxyalkyl or —$R^8NR^6R^7$, $R^6$ and $R^7$ independently are H, hydroxyalkyl or —$R^8NR^6R^7$, and $R^8$ is an ethylene or propylene radical, and where (on average) at least 30% of the nitrogens carry a hydroxyalkyl.

15. A composition as claimed in claim 14, where the alkanolamine is a reaction product of a polyethyleneimine with ethylene oxide.

16. A composition as claimed in claim 9, where the hydroxyalkyl group of the alkanolamine in the above definitions is hydroxypropyl or hydroxyethyl.

17. A composition as claimed in claim 1, where the weight ratio of polymer (A2) to alkanolamine is from 100:1 to 1:1.

18. A composition as claimed in claim 1, which additionally comprises a reaction accelerator.

19. A binder comprising a composition as claimed in claim 1.

20. A process for the manufacture of a shaped article comprising impregnating a substrate with a composition as claimed in claim 1, and curing the impregnated substrate.

21. A process as claimed in claim 20, wherein the substrate is a finely divided material, especially fibers, chips or slivers.

22. A shaped article as obtained by the process as claimed in claim 20, which is a chipboard or fiberboard, a car interior lining, an insulating material or a fiber web.

* * * * *